United States Patent [19]

Shimamoto et al.

[11] Patent Number: 5,147,691

[45] Date of Patent: * Sep. 15, 1992

[54] METHOD OF PRODUCING COVER-PACKING ASSEMBLY FOR HARD DISK DEVICE

[75] Inventors: Noboru Shimamoto; Tooru Takamura; Ryuichi Handa, all of Annaka, Japan

[73] Assignee: Shin-Etsu Chemical Co., Ltd., Tokyo, Japan

[*] Notice: The portion of the term of this patent subsequent to Aug. 21, 2007 has been disclaimed.

[21] Appl. No.: 546,764

[22] Filed: Jul. 2, 1990

[30] Foreign Application Priority Data

Jul. 3, 1989 [JP] Japan .................................. 1-171510

[51] Int. Cl.$^5$ ............................................. B05D 3/02
[52] U.S. Cl. ................................. 427/387; 427/207.1; 360/97.02; 360/98.08; 277/228
[58] Field of Search ................ 427/387, 207.1, 208.2; 360/97.02, 98.07, 98.08; 277/70, 228

[56] References Cited

U.S. PATENT DOCUMENTS

| | | | |
|---|---|---|---|
| 3,900,617 | 8/1975 | Grenoble | 427/387 |
| 4,257,936 | 3/1981 | Matsumoto et al. | 427/387 |
| 4,421,783 | 12/1983 | Marwitz et al. | 427/387 |
| 4,726,964 | 2/1988 | Isobe et al. | 427/387 |
| 4,739,427 | 4/1988 | Kilmer et al. | 360/97 |
| 4,780,338 | 10/1988 | Saad et al. | 427/387 |
| 4,812,334 | 3/1989 | Linser et al. | 427/387 |
| 4,851,166 | 7/1989 | Kendall | 427/387 |
| 4,950,521 | 8/1990 | Takamura et al. | 428/78 |
| 4,956,206 | 9/1990 | Kaiya et al. | 427/387 |
| 5,019,419 | 5/1991 | Matsumoto et al. | 427/96 |

FOREIGN PATENT DOCUMENTS 61-63991  4/1986  Japan .................. 360/98.08

Primary Examiner—Shrive Beck
Assistant Examiner—Diana L. Dudash
Attorney, Agent, or Firm—Oblon, Spivak, McClelland, Maier & Neustadt

[57] ABSTRACT

A method of producing a cover-packing assembly for a hard disk device is disclosed which comprises applying a liquid self-adhesive silicone rubber material to a predetermined position of a cover member, and curing the rubber material. According to the method, the formation of a packing member and the adhesion of the packing member to the cover member are performed simultaneously on the cover member. Thus, use of a pressure sensitive adhesive, an adhesive or the like, as in the case of employing a packing member comprising a molded or die-cut product, is unnecessary in this method, which is extremely advantageous.

8 Claims, No Drawings

METHOD OF PRODUCING COVER-PACKING ASSEMBLY FOR HARD DISK DEVICE

BACKGROUND OF THE INVENTION

1. Field of the Invention

This invention relates to a method of producing a cover-packing assembly which comprises forming a rubber packing on a cover member for a hard disk device and, simultaneously with the formation, adhering the rubber packing firmly to the cover member.

2. Description of the Prior Art

A hard disk device generally comprises disks of an aluminum alloy or the like coated with a magnetic material which are enclosed in a sealed container, and magnetic heads each disposed close to the disk, with an about 0.2- to 0.5-$\mu$m gap therebetween, for recording and reproduction of information into and from the disks.

In the hard disk device, it is necessary to prevent head crash, breakage of magnetic surfaces of the disks or the like troubles from occurring due to the dust present in the device or coming into the device from the outside.

In order to obviate such troubles, therefore, there has been used a system in which air is circulated in the sealed container through a high performance filter, for pressure regulation and cleaning of air, and a sealing packing is provided between each cover (top cover, down cover, etc.) and the container.

As the known packing of this type, there have hitherto been packing members molded from, or die-cut from a molded sheet of, neoprene rubber, urethane rubber, silicone rubber, nitrile-butadiene rubber, etc., and packing members die-cut from foam sheets of these rubbers, polyethylene, etc.

Where such a molded or die-cut rubber product or the like is used as the packing member, however, there is need for troublesome work, for instance, the preliminary adhesion of a release paper to the packing by a pressure sensitive adhesive or the use of an adhesive in applying the packing member to the cover member. In addition, accurate positioning of the cover member and the packing member is difficult to carry out and requires man power or skill, leading to a great loss and, inevitably, to a disadvantage on an economical basis.

Furthermore, with regard to cleanliness required also of the packing member itself, the contamination by a pressure sensitive adhesive, an adhesive or the like used for joining the packing member and the cover member is difficult to avoid. Particularly, the use of a molded packing member involves the problem of slippage arising from defective finishing of flashes, whereas the use of a foamed packing member has the problem of dropping of the dust having penetrated into the cell portions.

SUMMARY OF THE INVENTION

This invention solves the above-mentioned problems by applying a liquid self-adhesive silicone rubber to a predetermined cover member, thereby achieving simultaneously the formation of a packing and the adhesion of the packing to the cover member.

According to this invention, there is provided a method of producing a cover-packing assembly for a hard disk device which comprises applying a liquid self-adhesive rubber material to a predetermined position of a cover member for the hard disk device, and curing the rubber material.

In this invention it is not necessary at all to prepare a shaped packing product conforming to a joint portion of a cover member, by molding or by die-cutting from a sheet. Thus, neither mold nor cutting die is used in this invention.

Because formation of a packing and adhesion of the packing to a cover member are performed on the cover member directly and simultaneously, according to this invention, there is no need for the steps ordinarily carried out in the case of employing a molded or die-cut packing member, such as application of pressure sensitive adhesive, application and later removal of a release paper, a special treatment with an adhesive, etc.

Further, since the liquid rubber material applied to the cover member is cured to directly form the packing, there is no material loss due to flashes of molded products, cutting loss involved in die-cut products, etc. This absence of material loss is advantageous on the basis of resources.

Moreover, according to the method of this invention, conventional adhesives or pressure sensitive adhesives are not used at all and there is no generation of flashes of a molded product or the like, so that cleanness of the integral whole of the cover member and the packing is maintained.

In addition, because of the use of a self adhesive type silicone rubber, preferably of the addition-curing type, there is not used a process oil, which is usually blended as an internal plasticizer in a synthetic rubber or the like. As a result, there is no possibility of contamination of the cover member due to an oily blooming or solid blooming phenomenon, and the packing formed has excellent weatherability. As the seal performance, the packing shows little compression set, shows excellent elasticity and enables clamping with a low compressive force.

DETAILED DESCRIPTION OF THE INVENTION

Packing Material

As the packing material in this invention, a self-adhesive liquid silicone rubber material is used.

As the silicone rubber material, any of those silicone rubber materials of the addition-curing type, condensation-curing type or the like which are, per se, liquid and self-adhesive can be used. However, addition-curing type liquid silicone rubber compositions are preferred, in view of their smooth and fixed shape maintained after application to the cover member and their quick-curing properties and excellent adhesive properties.

The addition-curing type liquid silicone rubber composition preferable for use in this invention is, for instance, a composition comprising a diorganopolysiloxane having an aliphatic unsaturated group, as a base component, which is admixed with an organohydrogenpolysiloxane having a silicon-bonded hydrogen atom serving as a cross-linking agent.

In the diorganopolysiloxane used as the base component, preferred examples of the aliphatic unsaturated group are normally $C_2$–$C_6$ alkyl groups such as vinyl, allyl, butenyl and hexenyl. It is preferable that the diorganopolysiloxane has, in one molecule thereof, at least two such aliphatic unsaturated groups in the form of being bonded to a silicon atom. Organic groups which may be present in the diorganopolysiloxane other than the aliphatic unsaturated groups include substituted or unsubstituted monovalent hydrocarbon groups having normally 1-10 carbon atoms, preferably 1-8 carbon atoms, e.g., lower alkyl groups such as methyl, ethyl, propyl, butyl, etc., cycloalkyl groups such as cyclohexyl, aryl groups such as phenyl, aralkyl groups such as benzyl and 2-phenylethyl, and corresponding substituted hydrocarbon groups in which a part or all of the hydrogen atoms have been substituted by a halogen atom, cyano group, etc., such as chloromethy, 3,3,3-trifluoropropyl and 2-cyanoethyl. Besides, it is desirable that the diorganopolysiloxane be a linear one.

The organohydrogenpolysiloxane used as the crosslinking agent has the silicon-bonded hydrogen atoms which perform an addition reaction with the aliphatic unsaturated groups in the diorganopolysiloxane to crosslink the molecules of the diorganopolysiloxane to each other. The organohydrogen-polysiloxane may have any of linear, cyclic, branched and other molecular structures. It is preferable, however, that the organohydrogenpolysiloxane has at least two, particularly at least three, silicon-bonded hydrogen atoms in its molecule, and that it has 300 or less of silicon atoms in its molecule. By use of such an organohydrogenpolysiloxane, it is possible to control the hardness, modulus of elasticity and strength of the cured product obtained upon crosslinking. This organohydrogenpolysiloxane may contain silicon-bonded substituted or unsubstituted monovalent hydrocarbon groups having normally 1-10 carbon atoms, preferably 1-8 carbon atoms as exemplified in respect of said diorganopolysiloxane having an unsaturated aliphatic group.

It is desirable for the diorganopolysiloxane and organohydrogenpolysiloxane to be blended in such amounts that the molar ratio of the ≡SiH groups in the organohydrogenpolysiloxane (provided that if the adhesiveness-imparting agent described below contains the ≡SiH group, the total of the ≡SiH groups) to the aliphatic unsaturated groups in the diorganopolysiloxane is from 0.5 to 4, particularly from 1 to 2.

If necessary, a platinum family metal catalyst for curing, an adhesiveness-imparting agent and various fillers such as reinforcing silica, etc., can be mixed into the addition-curing type liquid silicone rubber composition. The preferred platinum family metal catalyst includes, for example, chloroplatinic acid, alcohol-modified chloroplatinic acid, and coordination compounds of chloroplatinic acid with an olefin, vinylsiloxane or acetylene compound. It is generally preferable that such a platinum catalyst is mixed in an amount, in terms of platinum, of from 0.1 to 200 ppm based on the diorganopolysiloxane. Preferred adhesiveness-imparting agents include, for instance, silicon compounds having a functional group such as epoxy and alkoxyl, which may be present singly or in combination, in the molecule thereof, and more preferred ones are silicon compounds which have an aliphatic unsaturated group or a silicon-bonded hydrogen atom necessary for the addition reaction described above, in addition to said functional group, in the molecule thereof. Specific examples of the preferred adhesiveness-imparting agent include the following compounds:

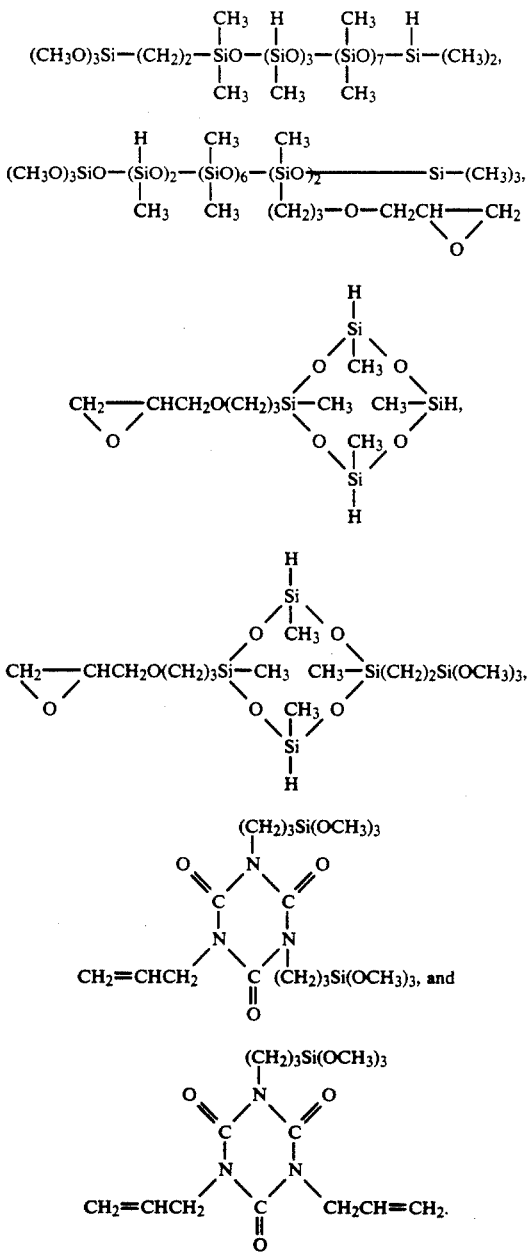

In general, the amount of such adhesiveness-imparting agents is preferably from 0.1 to 10 parts by weight, particularly from 0.5 to 5 parts by weight, per 100 parts by weight of the diorganopolysiloxane. A preferable range of the amount of the filler, such as silica reinforcing agent, is ordinarily from 5 to 40 parts by weight, particularly from 10 to 30 parts by weight, per 100 parts by weight of the diorganopolysiloxane.

Also, it is desirable that the liquid self-adhesive silicone rubber material for use in this invention have a viscosity measured on a rotational viscometer at 25° C. of from 1,000 to 100,000 poises, from the viewpoint of workability and shape retention properties upon application to a cover member.

The hardness (JIS) Hs of the rubber material upon heat curing is preferably from 10 to 60. Where the hardness Hs is in the range mentioned, it is possible to alleviate effectively the stress load exerted on the cover or the like when an integral assembly of the rubber material, as packing, and the cover member is fastened to the container body of a hard disk device by small screws or the like.

Application of the Rubber Material

The liquid silicone rubber material as mentioned above is capable of being pumped, and of being applied to the cover member of the hard disk device by ejection from a nozzle, for example.

When the rubber material is applied to the cover member by ejection from a nozzle, in general, the sectional shape of the packing obtained is semicircular. It is possible, however, to obtain a rather flat-topped semi-elliptic sectional shape, by appropriate control of the ejecting conditions such as the nozzle height.

The predetermined position on the cover member to which the rubber material is to be applied can be set accurately, for instance by using a robot mechanism for coating according to a memorized pattern.

The rubber material applied to the cover member is rapidly cured, for instance by heating at a temperature of from 50° to 220° C., to form a packing on the cover member.

Of course, UV (Ultra Violet) curing, EB (Electron curing and the like means other than the heat curing can also be adopted, depending on the kind of the rubber material, etc.

The cover-packing assembly for a hard disk device formed as above is then subjected, if required, to washing with water, cleaning in air stream, drying and the like steps, and is attached to the container body of the device by small screws, whereby it is possible to maintain a hermetically sealed condition easily.

This invention will now be explained referring to the following example.

EXAMPLES

As the silicone rubber for the packing material, the following material was used.

One-part type addition-curing self-adhesive silicone rubber having the composition:

- 100 parts by weight of a dimethylpolysiloxane terminated with a trivinylsilyl group at both ends, having a vinyl content of 0.006 mol/100g and a viscosity of 100,000 cSt at 25° C.,
- 15 parts by weight of fumed silica treated with trimethylchlorosilane and having a specific surface area of 200 m$^2$/g,
- 0.2 parts by weight of 1% chloroplatinic acid solution in isopropyl alcohol,
- 0.3 parts by weight of a methylhydrogenpolysiloxane having a $\equiv$SiH group content of 0.009 mol/g,
- 2.0 parts by weight of an adhesiveness-imparting agent having a $\equiv$SiH group content of 0.004 mol/g, represented by the formula:

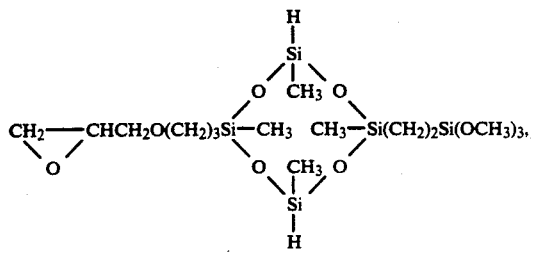

- 0.6 parts by weight acetylene alcohol acting as a retarder for the addition reaction.

(Note: The molar ratio of $\equiv$SiH/$\equiv$Si—CH=CH$_2$ in the composition was adjusted to 1.8)

| Viscosity measured on rotational viscometer (before cure): | 12,000 P |
|---|---|
| Properties after 150° C. × 1 hr cure: | |
| Hardness (JIS): | 30 |
| Elongation: | 820% |
| Tensile strength: | 60 kgf/cm$^2$ |
| Compression set (120° C., 20 hr): | 18% |

The above liquid silicone rubber was applied to a predetermined surface position of an aluminum top cover (coated with an epoxy coating material by electrodeposition) by a Coating Robot (trade name, a product by Three Bond Co., Ltd.) according to a memorized pattern.

The coating conditions were as follows:

| Nozzle inside diameter: | 1.4 mm |
|---|---|
| Feed pump pressure: | 2.1 kgf/cm$^2$ |
| Coating speed: | 3 m/min |
| Nozzle height (from cover surface): | 2.1 mm |

After the coating operation was over, the top cover as coated was placed into a hot-air dryer at 150° C. to cure the silicone rubber.

Upon cooling after the curing, a packing was obtained which had a semicircular section with 1.5 mm height and 2.2 mm width, in sufficiently good adhesion to the cover surface.

The cover-packing assembly thus obtained was washed with purified water (conductivity: 10 $\mu\Omega^{-1}$ or below) obtained by filtration through a 0.5-$\mu$m filter, was then air dried in a room of an air cleanliness class of 100 (0.3 $\mu$m) and clean-packed. The cover-packing assembly thus treated was brought into an assembly shop for hard disk devices, and mounted in a hard disk device. The hard disk device with the cover-packing assembly passed leak tests and cleanliness tests conducted for evaluation of the device. It was thus confirmed that the cover-packing assembly is extremely useful as a cover for a hard disk device was thus confirmed.

We claim:

1. A method of producing a cover-packing assembly for a hard disk device which comprises applying a liquid self-adhesive silicone rubber material to a predetermined position of a cover member for the hard disk device, curing the liquid self-adhesive silicone rubber material to form a cured silicone rubber material, and subsequently mating the cured silicone rubber material and the cover member to a base, wherein said cover-packing assembly consists of said cover member and a packing adhered to said cover member wherein said packing is made of said cured silicone rubber material.

2. The method according to claim 1, wherein the curing is carried out by heating at a temperature ranging from 50° to 220° C.

3. The method according to claim 1, wherein the liquid self-adhesive silicone rubber material comprises a liquid self-adhesive silicone rubber material which has a viscosity of from 1,000 to 100,000 poises at 25° C.

4. The method according to claim 3, wherein an addition-curing type silicone rubber composition is used as the silicone rubber material.

5. The method according to claim 4, wherein the addition-curing type silicone rubber composition comprises a diorganopolysiloxane having an aliphatic unsaturated group in its molecule and an organohydrogenpolysiloxane having a silicon-bonded hydrogen atom in its molecule.

6. The method according to claim 5, wherein the diorganopolysiloxane has at least two aliphatic unsaturated groups in its molecule, and the organohydrogenpolysiloxane has at least two silicon-bonded hydrogen atoms in its molecule.

7. The method according to claim 5, wherein the diorganopolysiloxane and the organohydrogenpolysiloxane are blended in such amounts that the molar ratio of the silicon-bonded hydrogen atoms in the organohydrogen-polysiloxane and the aliphatic unsaturated groups in the diorganopolysiloxane is in the range from 0.5 to 4.

8. The method according to claim 5, wherein said addition-curing type silicone composition further comprises at least one member selected from the group consisting of platinum family metal catalysts, organosilicone adhesiveness-imparting agents having at least one functional group selected from the group consisting of an epoxy group, an alkoxy group, an unsaturated aliphatic group and a silicone-bonded hydrogen atom, and fillers.

* * * * *